(12) United States Patent
Tanuma

(10) Patent No.: US 9,435,931 B2
(45) Date of Patent: Sep. 6, 2016

(54) LED LIGHTING APPARATUS

(71) Applicant: ROHM CO., LTD., Kyoto-shi, Kyoto (JP)

(72) Inventor: Yuki Tanuma, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 183 days.

(21) Appl. No.: 13/937,859

(22) Filed: Jul. 9, 2013

(65) Prior Publication Data

US 2014/0022815 A1 Jan. 23, 2014

(30) Foreign Application Priority Data

Jul. 19, 2012 (JP) ................................. 2012-160213

(51) Int. Cl.
*F21V 7/04* (2006.01)
*F21V 8/00* (2006.01)
*G02F 1/1335* (2006.01)

(52) U.S. Cl.
CPC ............ *G02B 6/0035* (2013.01); *G02B 6/0051* (2013.01); *G02B 6/0088* (2013.01); *G02F 1/133615* (2013.01); *G02B 6/0055* (2013.01); *G02B 6/0083* (2013.01)

(58) Field of Classification Search
CPC .................. G02F 1/133314; G02F 1/133608; G02F 1/133615
USPC ........ 362/606, 607, 609, 610, 612, 630–634
See application file for complete search history.

(56) References Cited

U.S. PATENT DOCUMENTS

| | | | | |
|---|---|---|---|---|
| 6,046,785 | A * | 4/2000 | Won .................................. | 349/58 |
| 7,113,237 | B2 * | 9/2006 | Nitto et al. ...................... | 349/58 |
| 7,258,478 | B2 * | 8/2007 | Chiang ........................... | 362/633 |
| 7,579,628 | B2 | 8/2009 | Inoguchi | |
| 7,594,746 | B2 | 9/2009 | Shin et al. | |
| 8,197,081 | B2 | 6/2012 | Cho et al. | |

(Continued)

FOREIGN PATENT DOCUMENTS

| | | |
|---|---|---|
| JP | 6-290632 A | 10/1994 |
| JP | 2002-251909 A | 9/2002 |
| JP | 2003-107468 A | 4/2003 |
| JP | 2005-353507 A | 12/2005 |
| JP | 2006-114854 A | 4/2006 |
| JP | 2006-147543 A | 6/2006 |
| JP | 2006-253108 A | 9/2006 |
| JP | 2009-181814 A | 8/2009 |
| JP | 2009-187875 A | 8/2009 |
| JP | 2010-15709 A | 1/2010 |
| JP | 2010-118348 A | 5/2010 |
| JP | 2011-134684 | 7/2011 |
| JP | 2011-159436 A | 8/2011 |

OTHER PUBLICATIONS

Office Action issued in corresponding Japanese Patent Application on Apr. 26, 2016 (5 pages).

*Primary Examiner* — Peggy Neils
*Assistant Examiner* — Alexander Garlen
(74) *Attorney, Agent, or Firm* — Hamre, Schumann, Mueller & Larson, P.C.

(57) ABSTRACT

An LED lighting apparatus of the invention includes a substrate having a length in a first direction and a width in a second direction. LED chips are supported on the substrate along the first direction. A light guide, having a thickness in the second direction, includes an incident surface, a reflective surface and an emitting surface. The incident surface faces in a third direction perpendicular to the first and second directions for receiving light emitted from the LED chips. The reflective surface spreads in the first and third directions and reflects light from the incident surface in the second direction. The emitting surface spreads in the first and third directions and allows light from the reflective surface to exit. The substrate is supported by a case that includes side plates around the light guide and a bottom plate connecting the side plates.

32 Claims, 17 Drawing Sheets

(56) References Cited

U.S. PATENT DOCUMENTS

| | | | |
|---|---|---|---|
| 2002/0008804 A1* | 1/2002 | Ogawa et al. | 349/58 |
| 2006/0104094 A1 | 5/2006 | Kang et al. | |
| 2010/0290248 A1* | 11/2010 | Park | 362/606 |
| 2011/0025944 A1* | 2/2011 | Lee et al. | 349/61 |
| 2012/0120326 A1* | 5/2012 | Takata | 348/790 |

* cited by examiner

LED LIGHTING APPARATUS

BACKGROUND OF THE INVENTION

1. Field of the Invention

The present invention relates to an LED lighting apparatus.

2. Description of the Related Art

LED lighting apparatuses that use LED chips as their light sources are increasingly used. Patent Document 1 (see e.g. JP-A-2011-134684) discloses an example of such an LED lighting apparatus. The LED lighting apparatus includes a plurality of LED chips arranged two-dimensionally and a cover covering the LED chips. The cover is translucent and passes light from the LED chips while diffusing the light.

The LED lighting apparatus is intended for use as an alternative to a conventional lighting apparatus provided with a fluorescent lamp. Thus, the LED lighting apparatus is made to have an appearance similar to that of a lighting apparatus provided with a fluorescent lamp. Since the LED chips are point light sources, the LED chips and the cover need to be spaced apart from each other by a sufficient distance in order that uniform light can be emitted from the cover. Thus, the thickness of the LED lighting apparatus cannot be sufficiently reduced in spite of the use of LED chips as the light source.

SUMMARY OF THE INVENTION

The present invention has been conceived under the above-described circumstances. It is therefore an object of the present invention to provide an LED lighting apparatus that can be reduced in thickness.

According to the present invention, there is provided an LED lighting apparatus comprising: at least one elongated substrate having a length in a first direction and a width in a second direction; a plurality of LED chips supported on the substrate and arranged along the first direction; a light guide plate including an incident surface, a reflective surface and an emitting surface and having a thickness in the second direction. The incident surface is oriented in a third direction perpendicular to both of the first and the second directions and configured such that light emitted from the LED chips is incident on the incident surface. The reflective surface spreads in the first and the third directions, causing light traveling from the incident surface to be reflected in the second direction. The emitting surface spreads in the first and the third directions, allowing light traveling from the reflective surface to exit. The lighting apparatus also includes a case supporting the substrate and including a plurality of side plates and a bottom plate, where the side plates surround the light guide plate, and the bottom plate connects the side plates to each other.

In a preferred embodiment of the present invention, the case includes at least one projection projecting from one side plate toward the light guide plate.

In a preferred embodiment of the present invention, the projection is formed with a screw hole.

In a preferred embodiment of the present invention, the LED lighting apparatus further includes a screw threaded in the screw hole and including an end held in contact with the light guide plate.

In a preferred embodiment of the present invention, the projection of the case comprises at least two projections spaced apart from each other in the first direction across the light guide plate.

In a preferred embodiment of the present invention, the case comprises a projection that projects from the side plate in the first direction, and that sandwiches an end of the substrate between itself and another side plate.

In a preferred embodiment of the present invention, the LED lighting apparatus further comprises a cable connected to the substrate, and the side plate is formed with a cut in which the cable is inserted.

In a preferred embodiment of the present invention, the substrate comprises two substrates spaced apart from each other in the third direction across the light guide plate.

In a preferred embodiment of the present invention, the LED lighting apparatus further comprises a cable connected to one of the two substrates, and the light guide plate includes a recess for inserting the cable between the light guide plate and the case.

In a preferred embodiment of the present invention, the case is formed by bending a metal plate.

In a preferred embodiment of the present invention, the light guide plate includes an inclined surface connected to an edge of the reflective surface.

In a preferred embodiment of the present invention, the LED lighting apparatus further comprises a cover formed with an opening that exposes the emitting surface.

In a preferred embodiment of the present invention, the cover is formed by bending a metal plate.

In a preferred embodiment of the present invention, the cover includes a plurality of side plates around the case and an extension extending out from the side plate and formed with a mounting hole.

In a preferred embodiment of the present invention, the plurality of LED chips are directly mounted on the substrate.

In a preferred embodiment of the present invention, the LED lighting apparatus according further comprises a plurality of reflectors each surrounding a respective one of the LED chips.

In a preferred embodiment of the present invention, the LED lighting apparatus further comprises a reflector collectively surrounding the LED chips.

In a preferred embodiment of the present invention, the LED lighting apparatus further comprises fluorescent resin covering the LED chips.

In a preferred embodiment of the present invention, the LED lighting apparatus further comprises a plurality of LED modules each of which includes the LED chip and a mounting terminal and which are mounted on the substrate.

In a preferred embodiment of the present invention, each of the LED modules includes a reflector surrounding the LED chip.

In a preferred embodiment of the present invention, each of the LED modules includes fluorescent resin covering the LED chip.

In a preferred embodiment of the present invention, the LED lighting apparatus further comprises a reflection sheet covering the reflective surface of the light guide plate.

In a preferred embodiment of the present invention, the LED lighting apparatus further comprises a diffusion sheet covering the emitting surface of the light guide plate.

According to the above-described structure, light from the LED chips is caused to enter the light guide plate via the incident surface, which is a side surface of the light guide plate, and then to exit from the emitting surface. With this arrangement, the thickness of the LED lighting apparatus is substantially equal to the total of the width of the substrate, or the thickness of the light guide plate, and the thickness of bottom plate of the case. Thus, the thickness of the LED lighting apparatus is reduced as compared with a conventional structure made similar to a ceiling light.

Other features and advantages of the present invention will become more apparent from detailed description given below with reference to the accompanying drawings.

DESCRIPTION OF THE PREFERRED EMBODIMENTS

Preferred embodiments of the present invention are described below with reference to the accompanying drawings.

Figure 1:
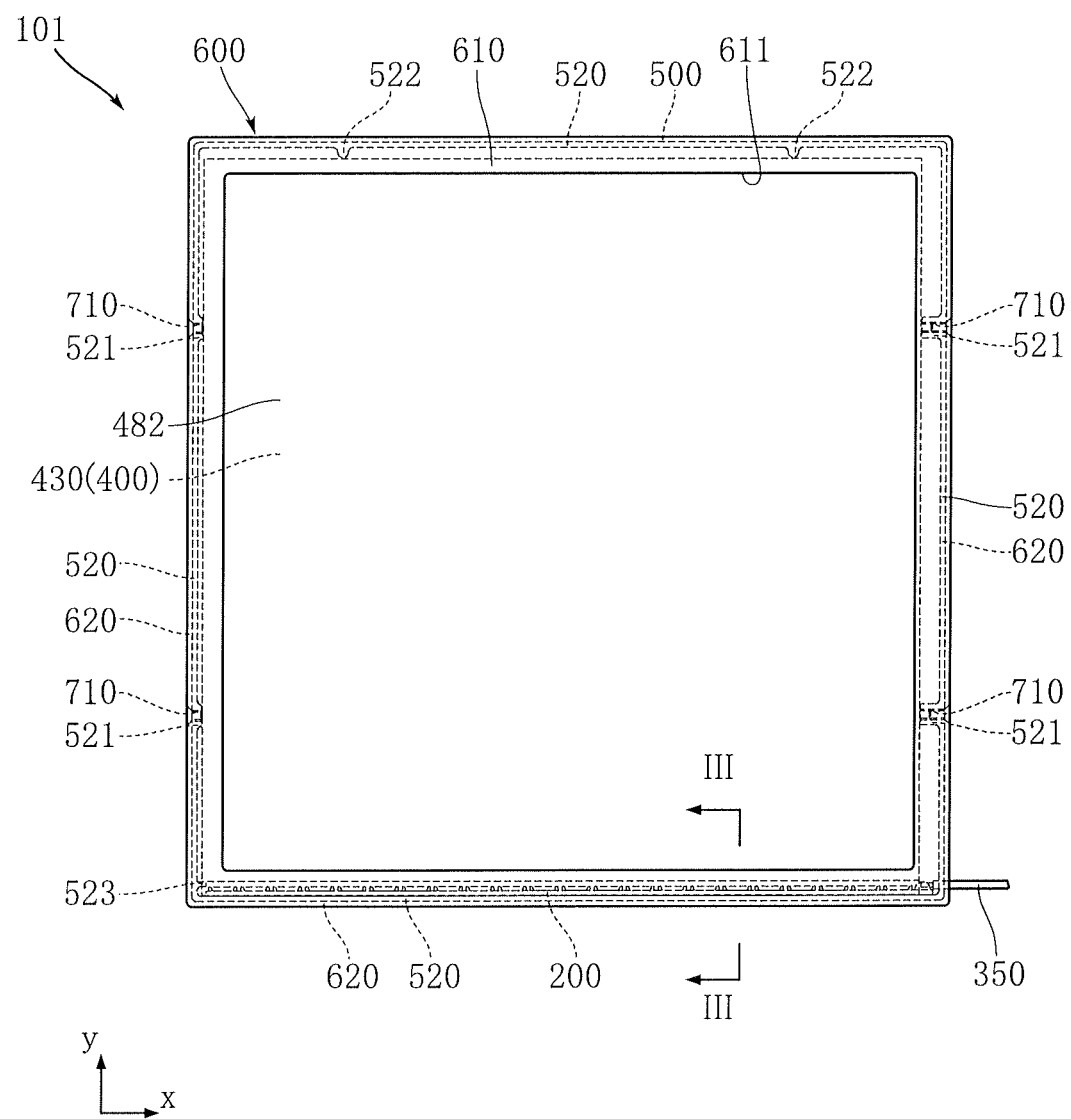
FIG. 1 is a plan view showing an LED lighting apparatus according to a first embodiment the present invention.
Figure 2:
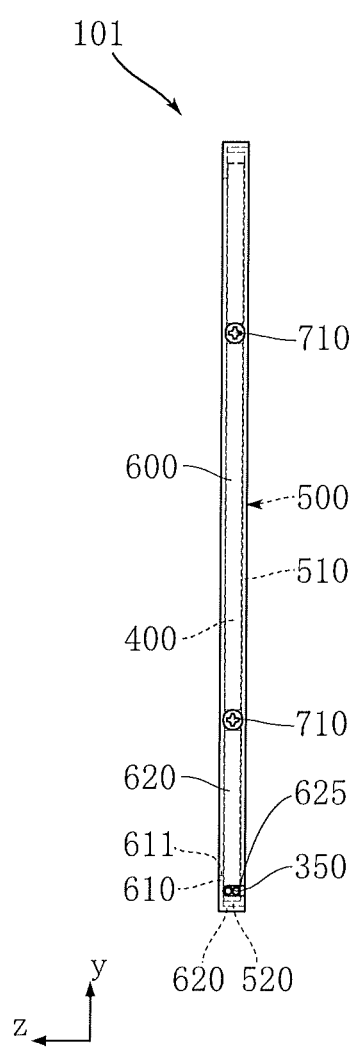
FIG. 2 is a side surface showing the LED lighting apparatus of FIG. 1.
Figure 3:
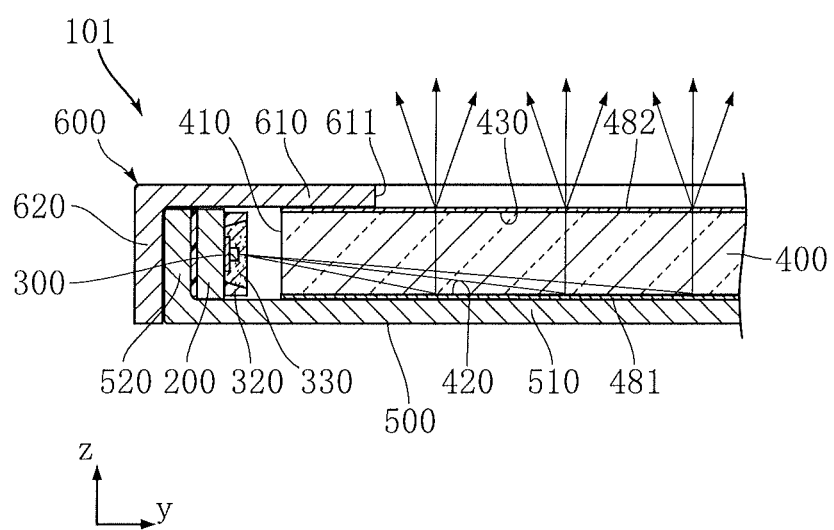
FIG. 3 is a schematic sectional view taken along lines III-III in FIG. 1.

FIGS. 1-3 show an LED lighting apparatus according to a first embodiment of the present invention. The LED lighting apparatus 101 of this embodiment includes a substrate 200, a plurality of LED chips 300, a light guide plate 400, a case 500 and a cover 600. The LED lighting apparatus 101 can be attached to e.g. a ceiling or a wall for use as a lighting apparatus for indoor lighting. As viewed in plan, the LED lighting apparatus 101 is in the form of a rectangle with sides of e.g. about 140-320 mm.

Figure 4:
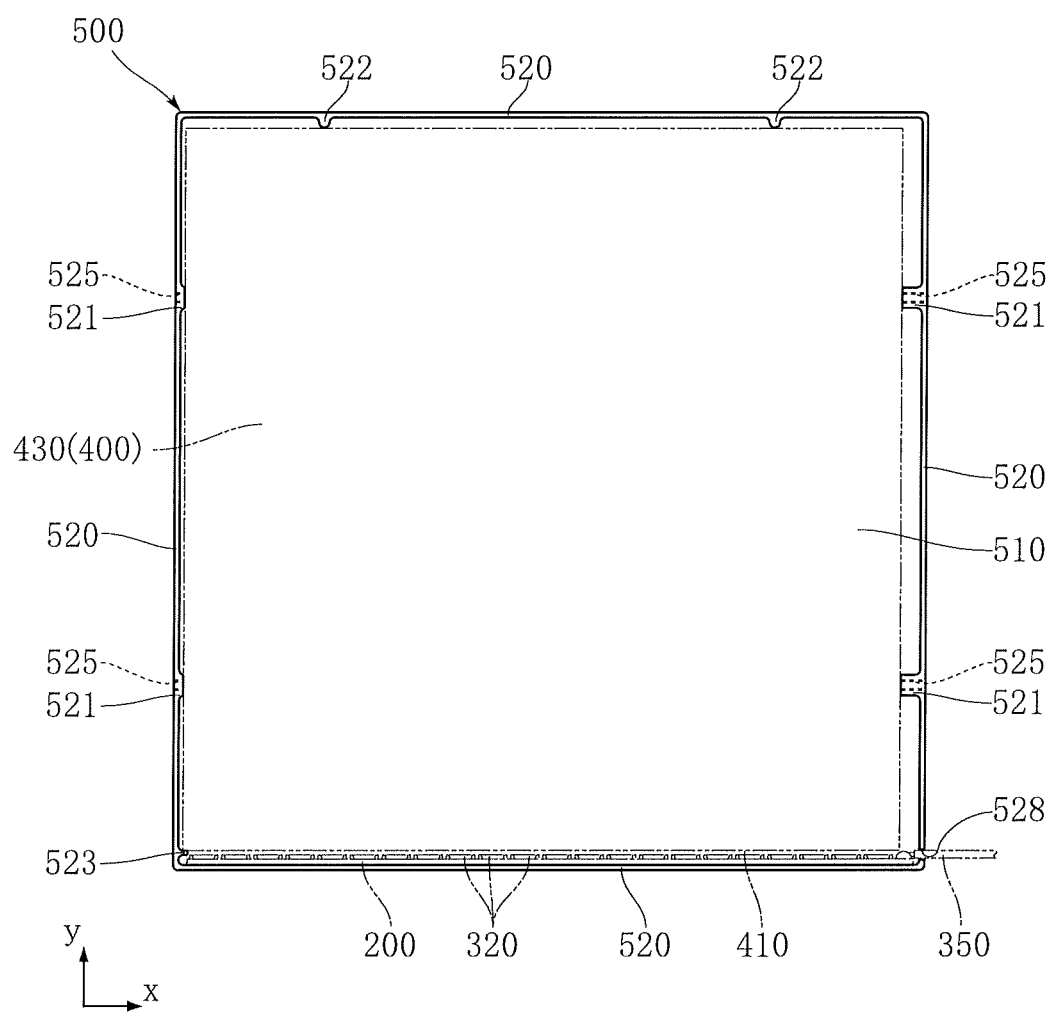
FIG. 4 is a plan view showing a case of the LED lighting apparatus of FIG. 1.
Figure 5:
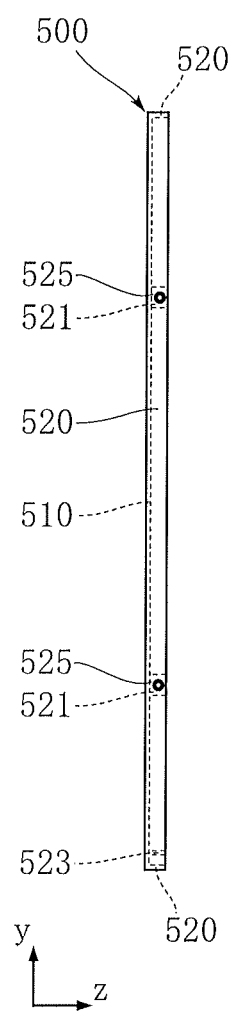
FIG. 5 is a side view showing the case of FIG. 4.
Figure 6:
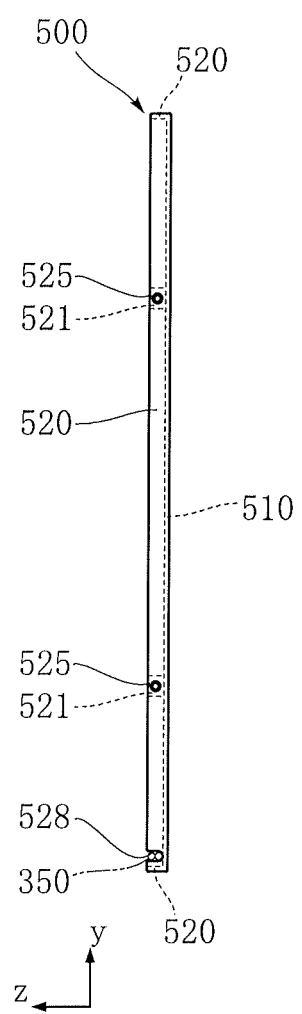
FIG. 6 is a side view showing the case of FIG. 4.

The case 500 houses and holds the substrate 200 and the light guide plate 400 and has a bottom plate 510 and four side plates 520 as shown in FIGS. 4-6. In this embodiment, the case 500 is formed by machining a metal member. However, the present invention is not limited to this, and the case 500 may be made of a resin. The bottom plate 510 is generally in the form of a square spreading in the x direction and the y direction. The four side plates 520 are connected to the four edges of the bottom plate 510, and each of the side plates is in the form of an elongated rectangle having a width in the z direction and a length in the x direction or the y direction.

Each of the two side plates 520 elongated in the y direction has two projections 521. Each projection 521 projects from the side plate 520 inward in the x direction. Each projection 521 has a screw hole 525. The side plate 520 on the upper side in FIG. 4, which is elongated in the x direction, has two projections 522. The side plate 520 on the left side in the figure has a projection 523 adjacent to its lower end in the figure. The side plate 520 on the right side in the figure has a cut 528 adjacent to its lower end in the figure. The light guide plate 400 is arranged in the region surrounded by the four projections 521, the two projections 522 and the projection 523. An end of the substrate 200 is between the projection 523 and the side plate 520 on the lower side in the figure.

Figure 7:
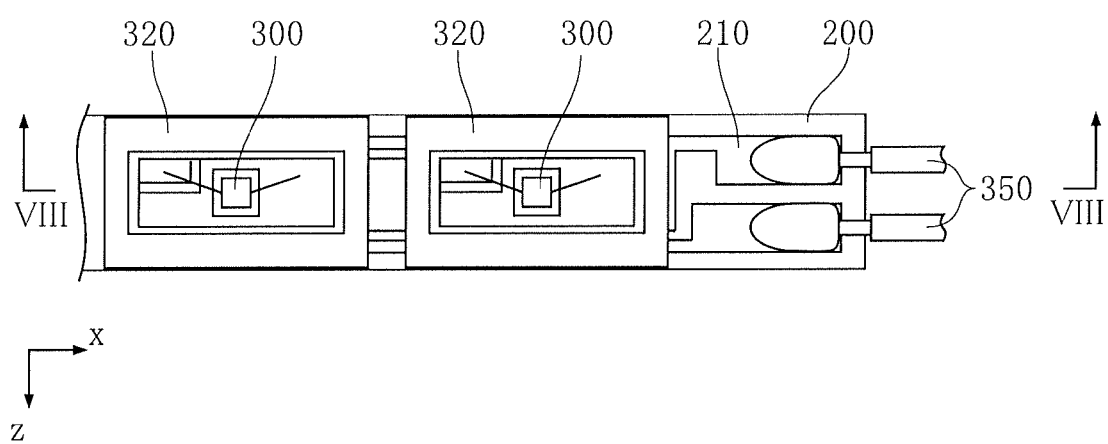
FIG. 7 is a plan view showing a substrate and LED chips of the LED lighting apparatus of FIG. 1.

The substrate 200 is in the form of an elongated rectangle having a length in the x direction and a width in the z direction. As shown in FIG. 7, the substrate 200 comprises a base and a wiring pattern 210 of a metal formed on the base. Note that illustration of a fluorescent resin 330, which will be described later, is omitted in FIG. 7 for easier understanding. For instance, the base may be made of a metal such as aluminum on which an insulating layer is formed, a ceramic material or a glass epoxy resin. The length of the substrate 200 is slightly shorter than that of the side plates 520 of the case 500. For instance, the substrate 200 is fixed to the side plate 520 via a double-sided adhesive tape.

Figure 8:
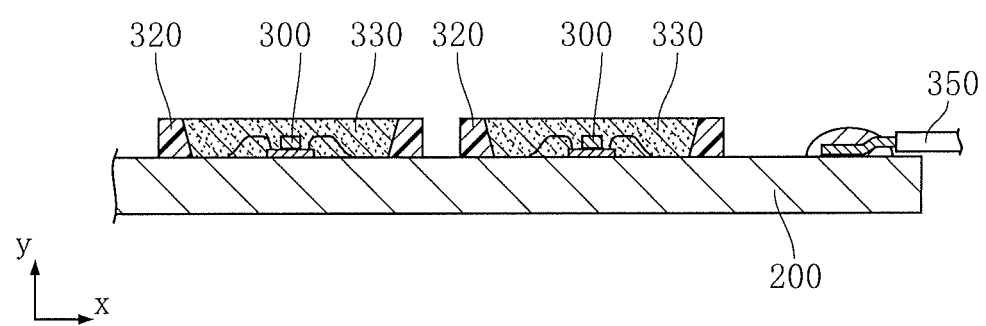
FIG. 8 is a schematic sectional view taken along lines VIII-VIII in FIG. 7.

As shown in FIGS. 7 and 8, the substrate 200 supports the LED chips 300. In FIG. 8, illustration of the wiring pattern 210 is omitted. In this embodiment, the LED chips 300 are directly mounted on the substrate 200 and arranged in a row extending in the x direction. Each LED chip 300 comprises a sub-mount substrate made of e.g. Si and a semiconductor layer made of e.g. GaN-based semiconductor and emits e.g. blue light. Each LED chip 300 is electrically connected to the wiring pattern 210 via two wires. The LED chip 300 is not limited to such a two-wire type as is employed in this embodiment, and a single-wire type or a flip chip type that does not use a wire may be employed.

Each LED chip 300 is surrounded by a respective one of the reflectors 320. For instance, the reflectors 320 are made of a white resin and formed on the substrate 200. Each reflector 320 has an inclined surface surrounding an LED chip 300. Each LED chip 300 is covered by a fluorescent resin 330. For instance, the fluorescent resin 330 comprises a transparent resin in which a fluorescent substance is mixed. As the fluorescent substance, a substance that emits yellow light when excited by blue light from the LED chip 300 is employed. Alternatively, a substance that emits red light and a substance that emits green light when excited by blue light from the LED chip 300 may be employed. A cable 350 is connected to the substrate 200. The cable 350 is provided for supplying electric power for lighting the LED chips 300 from an external power supply (not shown). The cable 350 is inserted in the cut 528 of the case 500.

The light guide plate 400 spreads in the x direction and the y direction, has a thickness in the z direction and is made of e.g. transparent polymethyl methacrylate (PMMA) resin. As shown in FIG. 3, the light guide plate 400 has an incident surface 410, a reflective surface 420 and an emitting surface 430. The incident surface 410 is oriented in the y direction and in the form of a rectangle elongated in the x direction. The incident surface 410 faces the LED chips 300 and light from the LED chips 300 becomes incident on the incident surface. The reflective surface 420 spreads in the x direction and the y direction and faces the bottom plate 510 of the case 500. The light entering through the incident surface 410 and traveling within the light guide plate 400 is reflected by the reflective surface 420 in the z direction. Specifically, the reflective surface 420 may be provided by applying white resin to a predetermined range in an appropriate pattern or by forming thin grooves or irregularities. The emitting surface 430 spreads in the x direction and the y direction and is on the opposite side of the reflective surface 420 in the z direction. The emitting surface 430 is a smooth surface through which light traveling from the reflective surface 420 is emitted to the outside.

The reflective surface 420 of the light guide plate 400 is covered by a reflection sheet 481. The reflection sheet 481 is made of e.g. white resin and functions to cause the light exiting through the reflective surface 420 to enter the light guide plate 400. The emitting surface 430 of the light guide plate 400 is covered by a diffusion sheet 482. The diffusion sheet 482 is made of e.g. semi-opaque or translucent resin and transmits the light emitted from the emitting surface 430 while diffusing the light.

Figure 9:
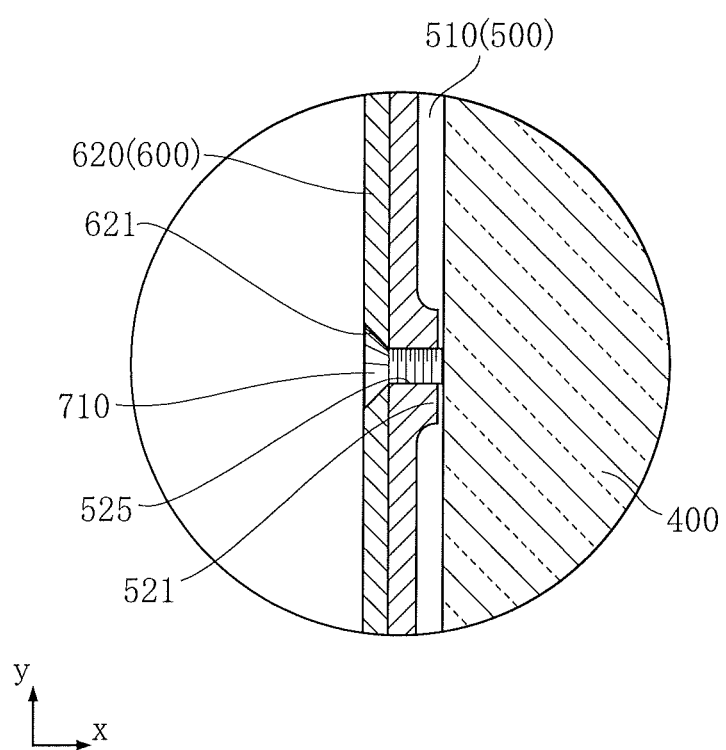
FIG. 9 is a schematic sectional view showing the LED lighting apparatus of FIG. 1.

As shown in FIGS. 1, 2 and 4, the light guide plate 400 is attached to the case 500 by using a plurality of screws 710. The screws 710 are threaded into the screw holes 525 of the projections 521 of the case 500. FIG. 9 is a schematic sectional view in an x-y plane with a screw 710. As shown in this figure, at least one of the screws 710 is, at its end, held in contact with the light guide plate 400. The screw on the opposite side of this screw 710 across the light guide plate 400 is not in contact with the light guide plate 400. The projection 521 having the screw hole 525 in which the opposite screw 710 not in contact with the light guide plate is threaded is in contact with the light guide plate 400.

The cover 600 covers the light guide plate 400 from the emitting surface 430 side and includes a top plate 610 in the form of a generally square frame and four side plates 620. The cover 600 may be formed by machining a metal member similarly to the case 500, or by molding a resin. The top plate 610 has an opening 611. The opening 611 exposes most part of the emitting surface 430 via the diffusion sheet 482. The four side plates 620 are connected to the four edges of the top plate 610. The side plates 620 have holes 621 at locations overlapping the screw holes 525 of the case 500. By inserting screws 710 into the holes 621, the cover 600 is attached to the case 500. As shown in FIG. 2, one of the side plates 620 has a cut 625, and the cable 350 is inserted into the cut 625.

The advantages of the LED lighting apparatus 101 are described below.

According to this embodiment, light from the LED chips 300 is caused to enter from the incident surface 410, which is a side surface of the light guide plate 400, and exit from the emitting surface 430. With this arrangement, the thickness of the LED lighting apparatus 101 is substantially equal to the total of the width of the substrate 200, or the thickness of the light guide plate 400, and the thickness of bottom plate 510 of the case 500. Thus, the thickness of the LED lighting apparatus 101 is reduced as compared with a conventional structure made similar to a ceiling light.

By providing the case 500 with a plurality of projections 521, 522, 523 and appropriately bringing the screws 710 into contact with light guide plate 400, the light guide plate 400 is properly fixed and positioned to the case 500. The projection 523 prevents the substrate 200 and the light guide plate 400 from becoming unfavorably close to each other.

Since the opening 611 is smaller than the emitting surface 430 of the light guide plate 400, the substrate 200 and the LED chips 300 are covered by the top plate 610 of the cover 600. Thus, light from the LED chips 300 is prevented from being directly viewed, and light of non-uniform brightness occurring before sufficient diffusion in the guide plate 400 is prevented from being viewed.

FIGS. 10-17 show other embodiments of the present invention. In these figures, the elements that are identical or similar to those of the foregoing embodiment are designated by the same reference signs as those used for the foregoing embodiment.

Figure 10:
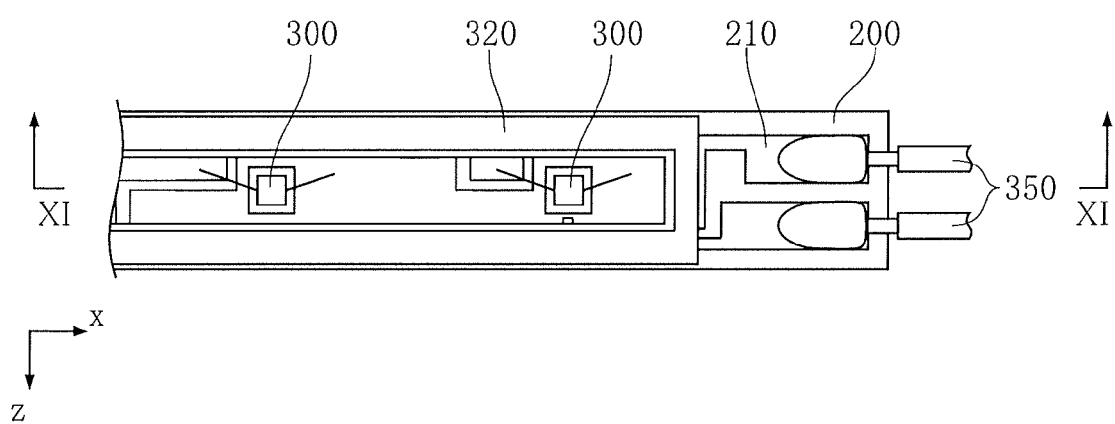
FIG. 10 is a schematic plan view showing another example of structures of a substrate and LED chips.
Figure 11:
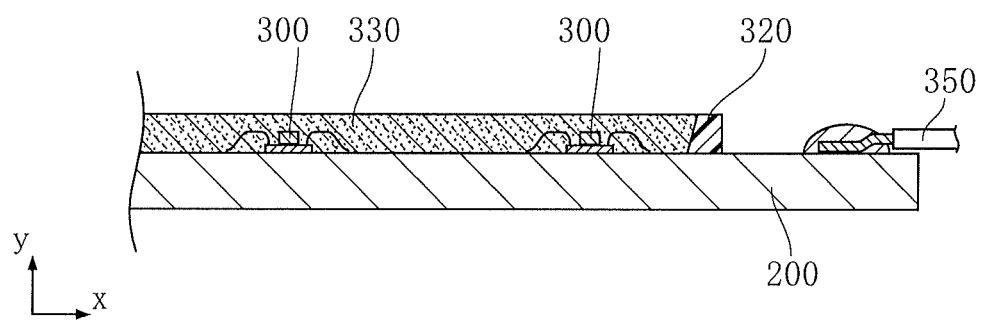
FIG. 11 is a schematic sectional view taken along lines XI-XI in FIG. 10.

FIGS. 10 and 11 show a variation of a reflector 320 and a fluorescent resin 330. In this variation, the reflector 320 is in the form of an elongated frame collectively surrounding a plurality of LED chips 300. The LED chips 300 are collectively covered by a single fluorescent resin 330. According to this structure, light from the LED chips 300 is diffused more efficiently in the fluorescent resin 330, which assures emission of more uniform light from the LED lighting apparatus 101.

Figure 12:
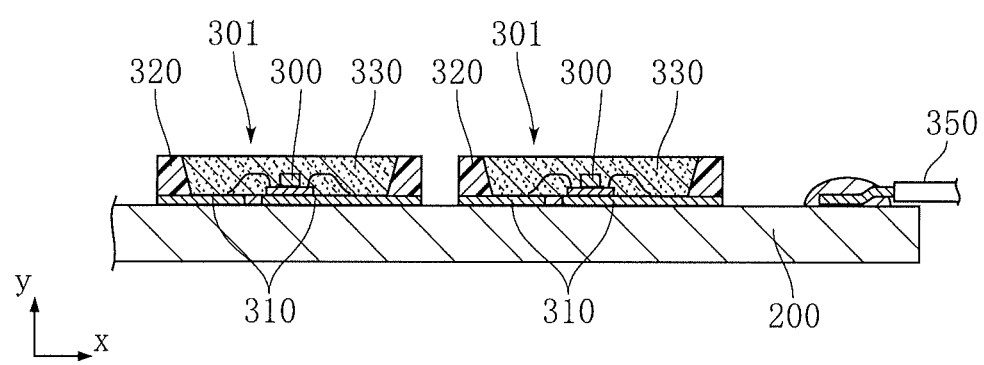
FIG. 12 is a schematic sectional view showing another example of structures of a substrate and LED chips.

FIG. 12 shows another variation. In this variation, the LED lighting apparatus 101 includes a plurality of LED modules 301. Each of the LED modules 301 has two leads 310. One surface of each lead 310 is used as a mounting terminal for mounting the LED module 301 on a substrate 200. An LED chip 300 is mounted to one of the leads 310. The two leads 310 and the LED chip 300 are connected to each other by two wires. Each LED module 301 includes a reflector 320 surrounding the LED chip 300 and a fluorescent resin 330 covering the LED chip 300. With this structure again, thickness reduction of the LED lighting apparatus 101 is achieved.

In the LED lighting apparatus of the present invention, the structures shown in FIGS. 7, 8, 10, 11, 12 can be employed appropriately.

Figure 13:
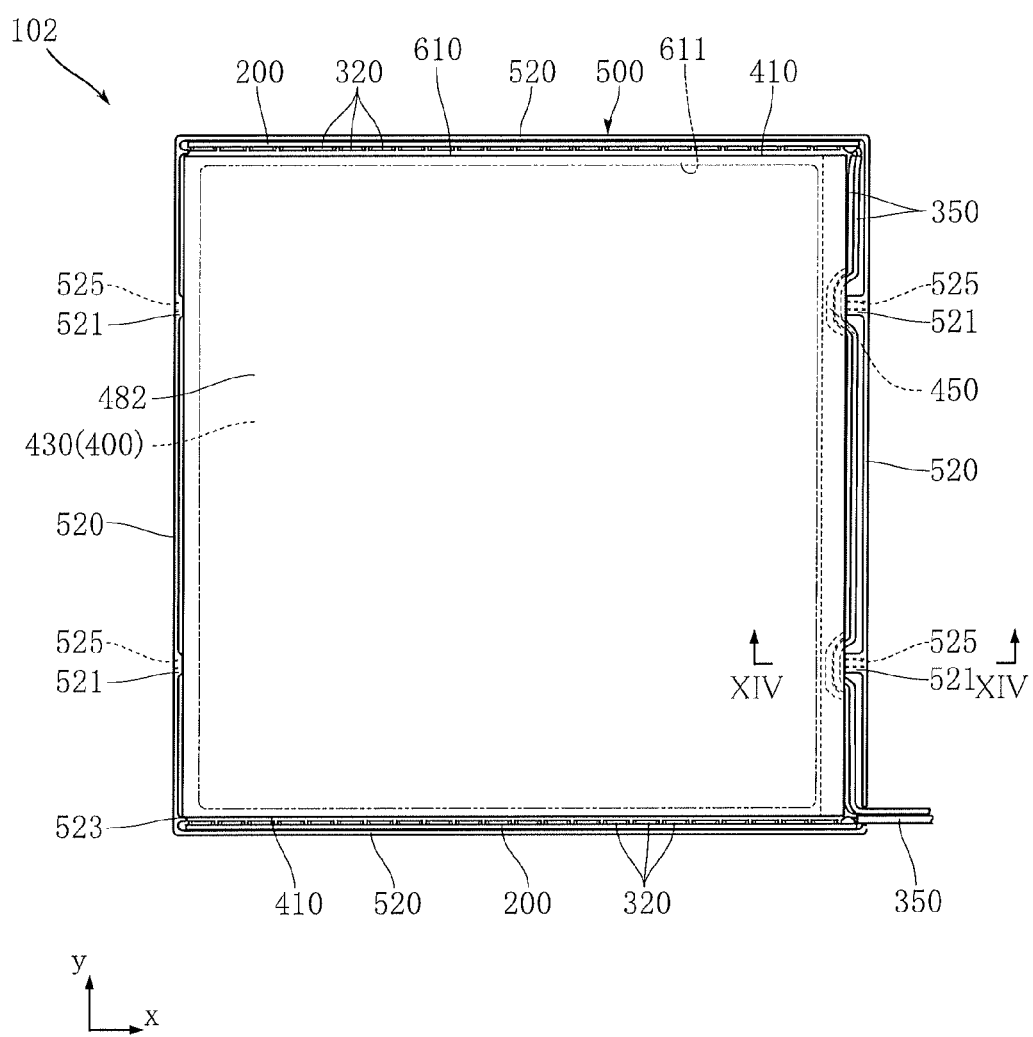
FIG. 13 is a plan view showing an LED lighting apparatus according to a second embodiment the present invention.
Figure 14:
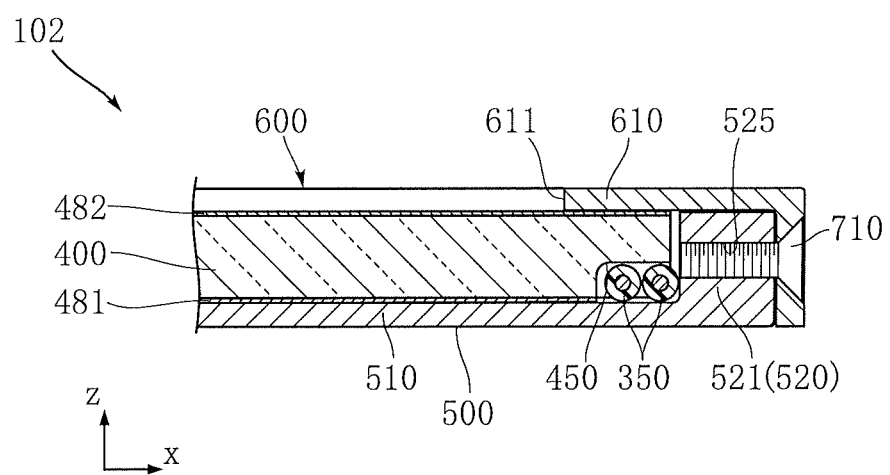
FIG. 14 is a schematic sectional view taken along lines XIV-XIV in FIG. 13.

FIGS. 13 and 14 show an LED lighting apparatus according to a second embodiment of the present invention. The LED lighting apparatus 102 of this embodiment includes two substrates 200. The two substrates 200 are arranged to sandwich the light guide plate 400 in the y direction. The structures of each substrate 200, LED chips 300 mounted on each substrate, the reflector 320 and the fluorescent resin 330 are the same as those described above. The light guide plate 400 have two incident surfaces 410 on opposite sides in the y direction. For easier understanding, illustration of the cover 600 is omitted and the opening 611 is indicated by imaginary lines in FIG. 13.

The light guide plate 400 has a recess 450. As better shown in FIG. 14, the recess 450 is dented in the x direction and the z direction and elongated in the y direction at one end of the light guide plate 400 in the x direction. The recess 450 is used for guiding a cable 350 connected to one of the substrates 200 to the cut 528 of the case 500 and the cut 625 of the cover 600. According to this structure, a larger amount of light is emitted from the LED lighting apparatus 102. Provision of the recess 450 in the light guide plate 400 prevents interference of the cable 350 with light guide plate 400.

Figure 15:
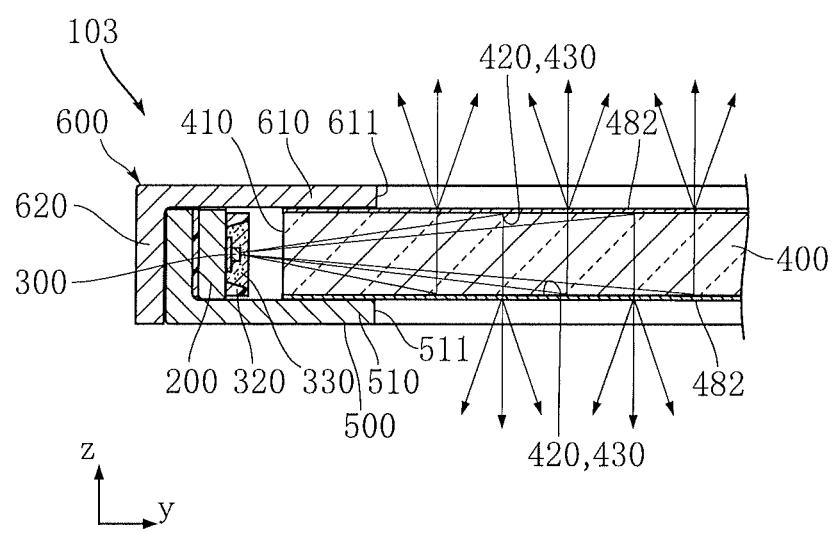
FIG. 15 is a schematic sectional view showing an LED lighting apparatus according to a third embodiment the present invention.

FIG. 15 shows an LED lighting apparatus according to a third embodiment of the present invention. In the LED lighting apparatus 103 of this embodiment, the bottom plate 510 of the case 500 has an opening 511. In this embodiment, each of the two surfaces of the light guide plate 400 which face in the z direction functions as both a reflective surface 420 and an emitting surface 430. To this end, a white resin for providing the reflective surface 420 may be applied dispersedly, so that light can pass through between the white resin portions. In this manner, one surface functions as both a reflective surface 420 and an emitting surface 430. The light guide plate 400 is provided with two diffusion sheets 482, one on each side in the z direction. According to this arrangement, the LED lighting apparatus 103 emits light toward two opposite sides in the z direction. The LED lighting apparatus 103 may be supported by an arm of a conventional desk lamp, whereby it can illuminate the work surface of the desk and the wall surface or the ceiling surface at the same time.

Figure 16:
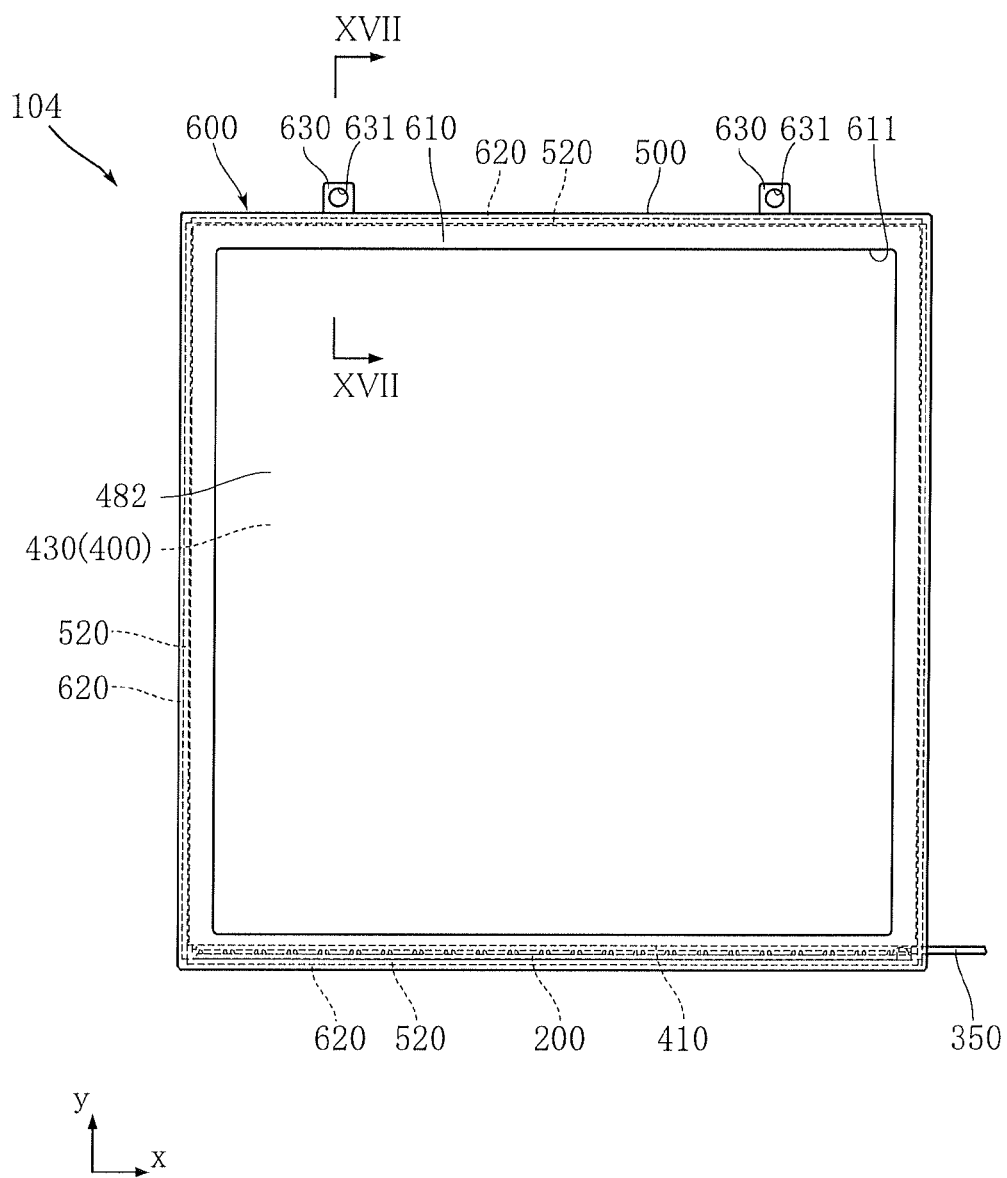
FIG. 16 is a plan view showing an LED lighting apparatus according to a fourth embodiment the present invention.
Figure 17:
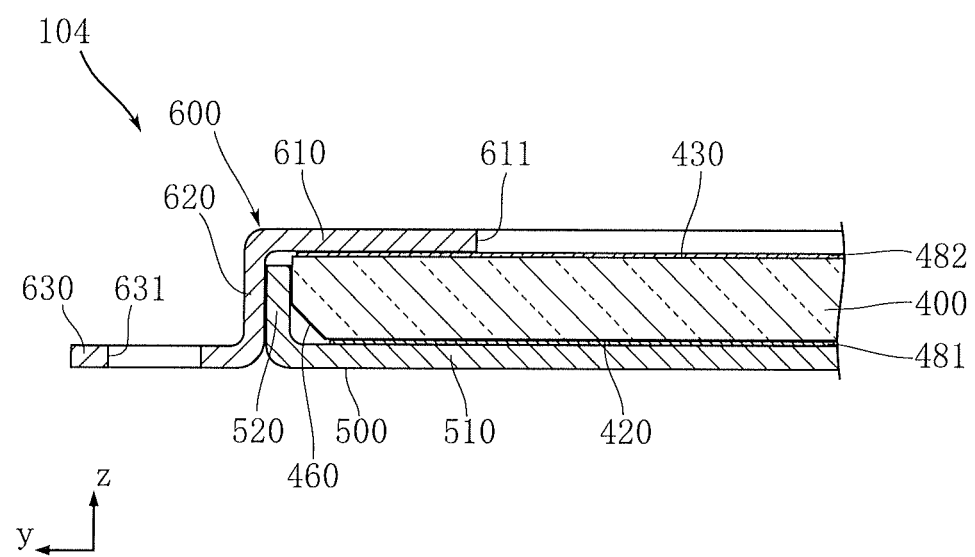
FIG. 17 is a schematic sectional view taken along lines XVII-XVII in FIG. 16.

FIGS. 16 and 17 show an LED lighting apparatus according to a fourth embodiment of the present invention. In the LED lighting apparatus 104 of this embodiment, the case 500 and the cover 600 are formed by bending metal plates. As better shown in FIG. 17, the light guide plate 400 has inclined surfaces 460. The inclined surfaces 460 are provided at four edges of the light guide plate 400, and each inclined surface faces to a boundary between the bottom plate 510 and a side plate 520 of the case 500. The cover 600 has two extensions 630. The extensions 630 extend from a side plate 620 in the y direction. Each extension 630 has a mounting hole 631. The mounting hole 631 is used for mounting the LED lighting apparatus 104 to a fixed object by fixing with screws or by engagement with metal fittings provided on a wall surface. The LED lighting apparatus 104 having this structure can be manufactured at a relatively low cost. Provision of inclined surfaces 460 at the light guide plate 400 prevents unfavorable contact between the concave curved surface of the case 500 formed by bending and edges of the light guide plate 400. Provision of the extensions 630 allows the LED lighting apparatus 104 to be fixed reliably.

The LED lighting apparatus of the present invention is not limited to the foregoing embodiments. The specific structure of each part of the LED lighting apparatus according to the present invention can be varied in design in many ways.

The invention claimed is:

1. An LED lighting apparatus comprising:
   at least one elongated substrate having a length in a first direction and a width in a second direction;
   a plurality of LED chips supported on the substrate and arranged along the first direction;
   a light guide plate including an incident surface, a reflective surface and an emitting surface and having a thickness in the second direction, the incident surface being oriented in a third direction perpendicular to both of the first and the second directions and configured such that light emitted from the LED chips is incident on the incident surface, the reflective surface spreading in the first and the third directions and causing light traveling from the incident surface to be reflected in the second direction, the emitting surface spreading in the first and the third directions and allowing light traveling from the reflective surface to exit; a case supporting the substrate and including a plurality of side plates and a bottom plate, the side plates surrounding the light guide plate, the bottom plate connecting the side plates to each other;
   a top plate opposite to the bottom plate with respect to the light guide plate; and
   a screw,
   wherein the case includes at least one projection projecting from one of the side plates toward the light guide plate,
   the projection is formed with a screw hole,
   the screw is threaded in the screw hole and includes an end held in direct contact with the light guide plate,
   the bottom plate has a single continuous flat surface area that directly faces the substrate and that extends from a position directly facing the substrate to a position directly facing the light guide plate, the single continuous flat surface area being parallel to the reflective surface of the light guide plate,
   the top plate has a single continuous flat surface area that directly faces the substrate,
   each of at least a pan of the light guide plate and the plurality of LED chips is disposed between the single continuous flat surface area of the bottom plate and the single continuous flat surface area of the top plate, and
   wherein the substrate is attached to one of the plurality of side plates, and said one of the plurality of side plates and the substrate have top surfaces, respectively, that are adjacent to the to plate and flush with each other.

2. The LED lighting apparatus according to claim 1, wherein the case comprises at least two projections spaced apart from each other in the first direction across the light guide plate.

3. The LED lighting apparatus according to claim 1, wherein the case comprises an additional projection that projects from one of the side plates in the first direction, and an end of the substrate is disposed between the additional projection and another one of the side plates.

4. The LED lighting apparatus according to claim 1, further comprising a cable connected to the substrate, wherein one of the side plates includes a cut in which the cable is inserted.

5. The LED lighting apparatus according to claim 1, wherein said substrate comprises two substrates spaced apart from each other in the third direction across the light guide plate.

6. The LED lighting, apparatus according to claim 5, further comprising a cable connected to one of the two substrates, wherein the light guide plate includes a recess for inserting the cable between the light guide plate and the case.

7. The LED lighting apparatus according to claim 1, wherein the case is forme by bending a metal plate.

8. The LED lighting apparatus according to claim 7, wherein the light guide plate includes an inclined surface connected to an edge of the reflective surface.

9. The LED lighting apparatus according to claim 1, further comprising a cover including an opening that exposes the emitting surface, wherein the top plate is formed by a part of the cover, and the opening is formed in the top plate.

10. The LED lighting apparatus according to claim 9, wherein the cover is formed by bending a metal plate.

11. The LED lighting apparatus according to claim 10, wherein the cover includes a plurality of side plates surrounding the case and an extension extending out from the side plate and formed with a mounting hole.

12. The LED lighting apparatus according to claim 1, wherein the plurality of LED chips are directly mounted on the substrate.

13. The LED lighting apparatus according to claim 12, further comprising a plurality of reflectors each surrounding a respective one of the LED chips.

14. The LED lighting apparatus according to claim 12, further comprising a reflector collectively surrounding the LED chips.

15. The LED lighting apparatus according to claim 12, further comprising fluorescent resin covering the LED chips.

16. The LED lighting apparatus according to claim 1, further comprising a plurality of LED modules each of which includes the LED chip and a mounting terminal and which are mounted on the substrate.

17. The LED lighting apparatus according to claim 16, wherein each of the LED modules includes a reflector surrounding the LED chip.

18. The LED lighting apparatus according to claim 16, wherein each of the LED modules includes fluorescent resin covering the chip.

19. The LED lighting apparatus according to claim 1, further comprising a diffusion sheet covering the emitting surface of the light guide plate.

20. The LED lighting apparatus according to claim 1, further comprising a reflection sheet covering the reflective surface of the light guide plate.

21. The LED lighting apparatus according to claim 1, wherein the bottom plate of the case is formed with an opening that exposes the reflective surface of the light guide plate.

22. The LED lighting apparatus according to claim 1, wherein a dicta in the third direction between each of the plurality of LED chips and the incident surface of the light guide plate is greater than a size of each of the plurality of LED chips measured in the third direction.

23. The LED lighting apparatus according to claim 1, wherein the substrate and the light guide plate are substantially same in size measured in the second direction.

24. The LED lighting apparatus according to claim 1, wherein the substrate is attached to one of the plurality of side plates, and said one of the plurality of side plates and the substrate have top surfaces: respectively, that are adjacent to the top plate and flush with each other.

25. The LED lighting apparatus according to claim 1, wherein the light guide plate has a flat side surface elongated in the third direction, and the end of the screw abuts on the flat side surface.

26. The LED lighting apparatus according, to claim 25, wherein the flat side surface is movable in sliding contact with the end of the screw in the third direction.

27. An LED lighting apparatus comprising:
   at least one elongated substrate having a length in a first direction and a width in a second direction;
   a plurality of LED chips supported on the substrate and arranged along the first direction;
   a light guide plate including an incident surface, a reflective surface and an emitting surface and having a thickness in the second direction, the incident surface being oriented in a third direction perpendicular to both of the first and the second directions and configured such that light emitted from the LED chips is incident on the incident surface, the reflective surface spreading in the first and the third directions and causing light traveling from the incident surface to be reflected in the second direction, the emitting surface spreading in the first and the third directions and allowing light traveling from the reflective surface to exit;
   a case supporting the substrate and including a plurality of side plates and a bottom plate, the side plates surrounding the light guide plate, the bottom plate connecting the side plates to each other; and
   a top plate opposite to the bottom plate with respect to the light guide plate;
   wherein the bottom plate has a single continuous flat surface area that directly faces the substrate and that extends from a position directly facing the substrate to a position directly facing the light guide plate, the single continuous flat surface area being, parallel to the reflective surface of the light guide plate,
   the top plate has a single continuous flat surface area that directly faces the substrate,
   each of at least a part of the light guide plate and the plurality of LED chips is disposed between the single continuous flat surface area of the bottom plate and the single continuous flat surface area of the top plate, and
   wherein the substrate is attached to one of the plurality of side plates, and said one of the plurality of side plates and the substrate have top surfaces, respectively, that are adjacent to the top plate and flush with each other.

28. The LED lighting apparatus according to claim 27, further comprising a cable connected to the substrate, wherein one of the side plates includes a cut in which the cable is inserted.

29. The LED lighting apparatus according to claim 27, further comprising a cover including an opening that exposes the emitting surface, wherein the top plate is formed by a part of the cover, and the opening, is formed in the top plate.

30. The LED lighting apparatus according to claim 27, further comprising a diffusion sheet covering the emitting surface of the light guide plate.

31. The LED lighting apparatus according to claim 27, further comprising a reflection sheet covering the reflective surface of the light guide plate.

32. The LED lighting apparatus according to claim 27, wherein the substrate and the light guide plate are substantially same in size measured in the second direction.

* * * * *